(12) United States Patent
Kuwabara (10) Patent No.: US 8,206,036 B2
(45) Date of Patent: Jun. 26, 2012

(54) LINEAR MOTION ROLLING GUIDE UNIT

(75) Inventor: Hideki Kuwabara, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 806 days.

(21) Appl. No.: 12/047,458

(22) Filed: Mar. 13, 2008

(65) Prior Publication Data

US 2008/0260306 A1 Oct. 23, 2008

(30) Foreign Application Priority Data

Mar. 15, 2007 (JP) ................................ 2007-066513

(51) Int. Cl.
*F16C 33/00* (2006.01)
*F16C 29/06* (2006.01)
(52) U.S. Cl. .......................................... 384/15; 384/43
(58) Field of Classification Search .................... 384/15, 384/43, 44, 45
See application file for complete search history.

(56) References Cited

U.S. PATENT DOCUMENTS

| | | | | | |
|---|---|---|---|---|---|
| 5,356,223 | A | * | 10/1994 | Agari | 384/15 |
| 5,360,271 | A | * | 11/1994 | Agari | 384/15 |
| 5,362,155 | A | * | 11/1994 | Ichida | 384/15 |
| 5,553,944 | A | * | 9/1996 | Osawa et al. | 384/15 |
| 6,766,897 | B2 | * | 7/2004 | Kuwabara | 198/750.1 |
| 7,380,988 | B1 | * | 6/2008 | Chen et al. | 384/15 |

FOREIGN PATENT DOCUMENTS

| | | |
|---|---|---|
| JP | 5-164128 | 6/1993 |
| JP | 2003-322151 | 11/2003 |

* cited by examiner

*Primary Examiner* — James Pilkington
(74) *Attorney, Agent, or Firm* — Cozen O'Connor

(57) ABSTRACT

A linear motion rolling guide unit, which has underside seals prevented from falling off a slider, comprises a slider having a pair of end caps secured at ends of a casing, and underside seals provided between the pair of end caps having engaging projections. Insertion holes are formed in the underside seals and engaged with the engaging projections to secure the underside seals to the slider. Fallout-inhibiting protrusions are provided at ends of each underside seal in the longitudinal direction. The slider has holding portions each having a hole or a recess into which each of the fallout-inhibiting protrusions is inserted when the underside seal is secured to the slider. A gap is maintained between the holding portion having the hole or the recess and the outer periphery of the fallout-inhibiting protrusion.

2 Claims, 11 Drawing Sheets

LINEAR MOTION ROLLING GUIDE UNIT

BACKGROUND OF THE INVENTION

1. Field of the Invention

This invention relates to a linear motion rolling guide unit which includes a slider having endless circulation passages into each of which rolling elements are incorporated and roll to slide the slider on a rail.

2. Description of the Related Art

Such a type of linear motion rolling guide unit is disclosed in JP-H5-164128-A and JP-2003-322151-A, for example. In these examples, rolling elements such as balls or rollers are rotatably held in a slider that comprises a casing and end caps fixed at the opposing ends of the casing. The slider straddles a rail and the rolling elements roll on raceway faces formed on the side faces of the rail, so that the slider is moved relative to the rail.

In a linear motion rolling guide unit comprising a slider straddling the rail as described above, a gap is created between each of the side faces of the rail and the slider. If dust enters the gap between the rail side face and the slider, the dust is dragged into the inside of the slider while the rolling elements roll. The entry of the dust into the slider makes it impossible to maintain a smooth sliding movement of the slider over a long time.

To avoid the entry of dust from the gaps created between the side faces of the rail and the slider, underside seals are secured to the slider to prevent the gaps between the side faces of the rail and the slider from being exposed.

Such underside seals for preventing the entry of dust are secured to the slider as described below. Receiving holes are drilled close to the opposing ends of each of the underside seals in the longitudinal direction. End caps, which are respectively provided on the opposing ends of the casing, have engaging projections each extending out from a portion of each end cap located close to the side face of the rail when the slider straddles the rail. When the engaging projection is fitted into the receiving hole of the underside seal, the underside seal is held in the sliding direction of the slider.

In some operating environments, the aforementioned linear motion rolling guide unit is accompanied by heavy vibration when the slider slides along the rail. For preventing the underside seal from falling away from the slider due to the heavy vibration, the dimensional relationship between the receiving hole in the underside seal and the engaging projection needs to be tightened to eliminate the play of the underside seal.

However, an increase in pressure is necessary to make a tight fitting between the receiving hole and the engaging projection as described above. Specifically, after the engaging projections are inserted into the receiving holes, the underside seal is strongly pressed to fit the engaging projections into the receiving holes.

In many cases, such a linear motion rolling guide unit has end caps formed of resin with a view to reducing weight and cost and the like. When a large external force as described above is applied to the engaging projections formed on a resin-made end cap, a crack may possibly occur in the engaging projections.

For example, in a large-sized linear motion rolling guide unit, when the slider is mounted on the rail, the slider has naturally an increased weight. When the slider with a heavy weight is picked up for transportation, an external force is applied to the underside seal, resulting in equally damage to the engaging projection.

In addition, even if the engaging projection is not damaged in the process of attaching the underside seal, the underside seal is secured in the con in which stress is being applied to the engaging projection, so that the stress causes the engaging projection to gradually deteriorate.

However, as long as the underside seal is attached to the slider, it is impossible to check the degree of deterioration of the engaging projection and the presence/absence of damage thereto. Because of this, until the underside seal actually falls away from the slider, the deterioration of the engaging projection is not found. In other words, it is difficult to replace the end cap or the slider before the underside seal falls off the slider.

In many cases, this results in the replacement of the end cap and the slider after the underside seal has fallen off the slider. If the underside seal falls off the slider, the falling of the underside seal has various adverse effects.

For example, when an apparatus includes a plurality of linear motion rolling guide units arranged in stages in the vertical direction, if a underside seal falls out during operation of the apparatus, the fallen underside seal bites into the slider located under the fallen underside seal, resulting in a chance of failure of the slider and/or a rail.

In an apparatus including a plurality of rails laid on a plane surface, if a underside seal falls between adjacent rails, the operation of the apparatus is required to be halted and then some processes of dismounting the rails and the like need to be performed for removing the fallen underside seal from the apparatus.

Such fallout of an underside seal from a slider as described above gives rise to problems of apparatus failure caused by the fallout from the slider and of stopping the operation of an apparatus in order to remove the fallen underside seal.

SUMMARY OF THE INVENTION

It is an object of the present invention is to provide a linear motion rolling guide unit having an underside seal attached to a slider and prevented from falling away from the slider.

The present invention provides a linear motion rolling guide unit equipped with a slider including a casing and a pair of end caps respectively secured to ends of the casing, and underside seals provided between the pair of end caps having a function of preventing entry of dust. Each of the end caps has engaging projections formed thereon. The slider has receiving holes formed therein. The engaging projections are respectively fitted into the receiving holes for securing the underside seal to the slider. The linear motion rolling guide is characterized in that each of the underside seals comprises fallout-inhibiting protrusions provided at ends in a longitudinal direction of the underside seal, and the slider comprises holding portions each having either a hole or a recess into which each of the fallout-inhibiting protrusions is inserted while maintaining a gap between an outer periphery of the fallout-inhibiting protrusion and the holding portions having either the hole or the recess when the underside seal is secured to the slider.

In the present invention, the slider preferably comprises end-face seals secured to ends in a sliding direction of the slider. The end-face seals are preferably provided independently of the end caps. The holding portions are preferably formed in the end-face seals.

Further, in a preferable embodiment of the present invention, the slider comprising the casing and the pair of end caps includes a body and a pair of side portions extending out from sides of the body at right angles. The underside seal has a flat plate shape. The slider has inclined faces respectively formed on portions of opposing faces at leading ends of the pair of side portions corresponding to the casing. The slider has stepped portions respectively formed on portions of opposing faces at leading ends of the pair of side portions corresponding to each of the end caps. Each of the stepped portions and each of the inclined faces maintain a dimensional relationship ensuring that the stepped portion is located between the inclined face and the leading end of the side portion. Each of the engaging projections is formed in the stepped portion. When the receiving holes of the underside seal are respectively engaged with the engaging projections, each of the underside seals is pressed against the stepped portions and a gap is created and maintained between the inclined face and the underside seal.

In the present invention, each of the underside seals preferably has an elastic protrusion formed in a portion facing the inclined face of the casing and the elastic protrusion reduces the gap between the inclined face and the underside seal.

According to the present invention, since the fallout-inhibiting protrusions respectively provided on the ends of the underside seal in the longitudinal direction are respectively inserted in the holding portions provided in the slider, even if the engaging projections deteriorate so as to be incapable of holding the underside seal, the fallout-inhibiting protrusions are caught in the holding portions. Thus, the underside seal does not fall away from the slider because the fallout-inhibiting protrusions provided on the underside seal are caught in the holding portions provided in the slider.

The fallout-inhibiting protrusions do not interfere with the engagement of the engaging projections with the receiving holes because a gap is provided between the holding portion and the outer periphery of the fallout-inhibiting protrusion when the underside seal is secured to the slider. As a result, the underside seal can be reliably retained by the engaging protrusions in the normal state, so that the dimensional relationship between the fallout-inhibiting protrusion and the holding portion can be determined somewhat roughly.

According to the present invention, in particular, even when stress is applied to the underside seal to press it against the casing, the elastic protrusion comes into contact with the casing, thereby reducing the force acting on the engaging protrusion. Accordingly, the engaging protrusions can be prevented from deteriorating due to, for example, an external force applied when the slider is mounted on the rail.

BEST MODE FOR CARRYING OUT THE INVENTION

An embodiment of the present invention will be described below with reference to FIG. 1 to FIG. 10.

Figure 1:
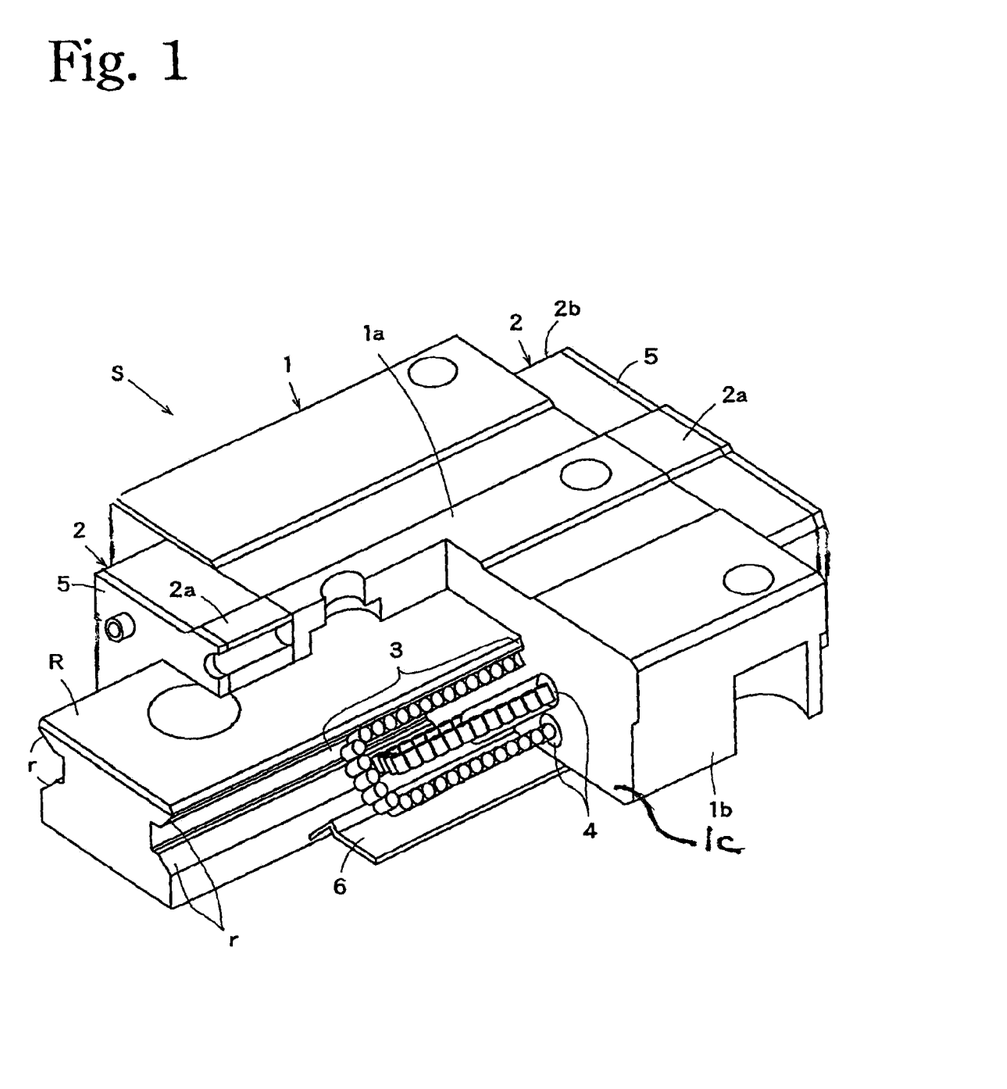
FIG. 1 is a perspective view of a linear motion rolling guide unit.

As illustrated in FIG. 1, a linear motion rolling guide unit in the embodiment comprises a slider S sliding on a rail R having raceway faces r formed on the side faces.

The slider S comprises a casing 1 and end caps 2 respectively secured at the opposing ends of the casing 1. Endless circulation passages are formed inside the casing 1 and the end caps 2. A plurality of rolling elements 3, which in this embodiment are rollers, are endlessly circulated in the endless circulation passages. Specifically, the casing 1 comprises a body 1a, and a pair of side portions 1b which extend out from the respective sides of the body 1a at right angles. Similar to the casing 1, each of the end caps 2 comprises a body 2a and a pair of side portions 2b extending out from the respective sides of the body 2a at right angles. That is, the entire slider S comprises a body and side portions extending out from the respective sides of the body at right angles.

The endless circulation passages extend through the pair of side portions 1b of the casing 1 between the pairs of side portions 2b of the end caps 2. A plurality of rolling elements 3, which are rollers, are rotatably loaded in each of the endless circulation passages.

An oil-retaining sleeve 4 provided with lubricating oil is mounted in each endless circulation passage, so that the rolling elements 3 are lubricated by rolling in the oil-retaining sleeve 4.

End-face seals 5, which are components independent of the end caps 2, are respectively secured on the opposing ends of the slider S in the sliding direction, that is, on the faces of the end caps 2 opposite to the casing 1. Each of the end-face seals 5 is provided with lip portions respectively coming into contact with the raceway faces r of the rail R to fulfill the functions of preventing the rolling movement of the rolling elements 3 from causing the oil coated on the raceway faces r to leak from the sliding range of the slider S and also of preventing dust from entering the slider S from the raceway faces r.

Underside seals 6 are secured to portions of the respective leading ends (1c, 2c) of the pair of side portions (1b, 2b) of the slider S located close to the raceway faces r of the rail R.

Figure 2:
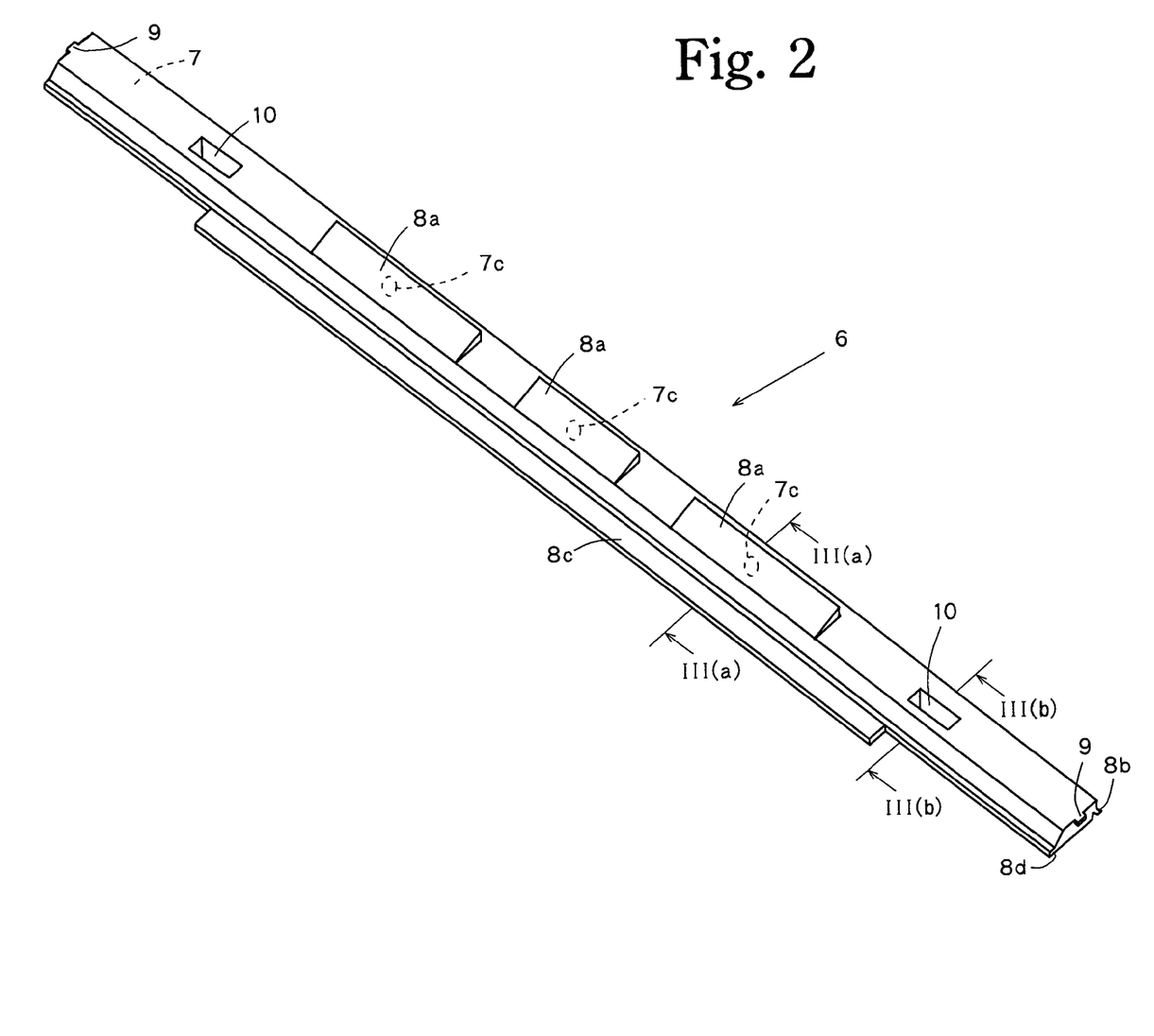
FIG. 2 is a perspective view of an underside seal.
Figure 3:
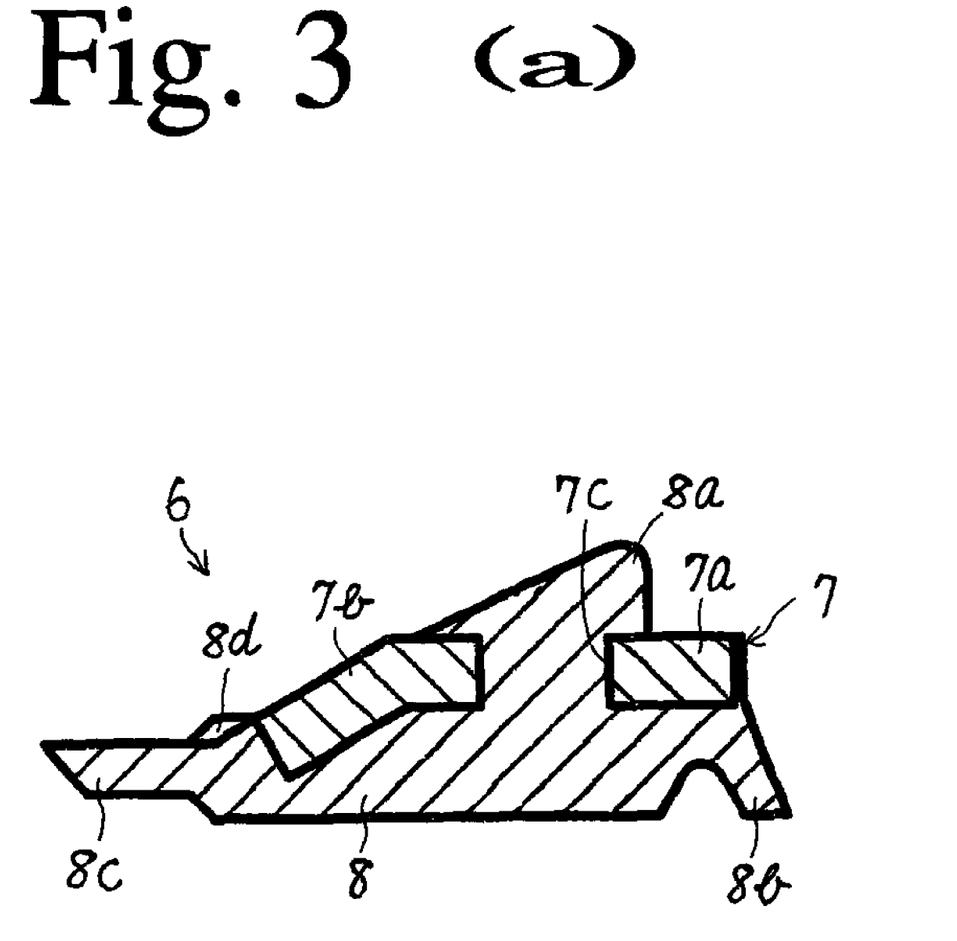
FIG. 3A is a sectional view taken along the III(a)-III(a) line in FIG. 2.
FIG. 3B is a sectional view taken along the III(b)-III(b) line in FIG. 2.

As shown in FIG. 2, FIG. 3A and FIG. 3B, each of the underside seals 6 comprises a metal-made cored bar 7 and an elastic member 8 such as rubber coated on the outer surface of the cored bar 7. The cored bar 7 is provided with a flat portion 7a and an inclined portion 7b inclined in the width direction of the flat portion 7a. Three rubber injection holes 7c as illustrated in FIG. 3A are formed in an intermediate area of the flat portion 7a of the cored bar 7 in the longitudinal direction.

The elastic member 8 coated around the cored bar 7 passes through the rubber injection holes 7c to form elastic protrusions 8a. That is, the underside seal 6 is structured by coating the outer face of the cored bar 7 with the elastic member 8, in which a thinner coating of the elastic member 8 is applied to one face of the underside seal 6 (the upper face in FIGS. 3A, 3B) such that each of the elastic protrusions 8a partially protrudes from this thin coated face through the rubber injection hole 7c. On the other hand, on the face opposite to the face from which the elastic protrusion 8a protrudes (the lower face in FIGS. 3A, 3B), the coating of the elastic member 8 has a larger thickness such as to form a flat plate shape in the entirety of the underside seal 6.

A first lip 8b is formed at one edge portion of the underside seal 6 in the width direction (corresponding to the right end in FIGS. 3A, 3B). A second lip 8c is formed at the other edge portion in the width direction (corresponding to the left end in FIGS. 3A, 3B). The first lip 8b is formed over the entire length of the underside seal 6 in the longitudinal direction, whereas the second lip 8c is not formed in the vicinity of the ends of the underside seal 6. In other words, the second lip 8*c* is formed only around the central portion of the underside seal 6. Each of these portions of the underside seal 6 without the second lip 8*c* corresponds to the thickness of the end cap 2, which will be described in detail later.

Reference numeral 8*d* in FIGS. 3A, 3B denotes a pressure connecting portion formed of the elastic member 8. The pressure connecting portion 8*d* is located in the leading end of the inclined portion 7*b* of the cored bar 7 in the vicinity of each of the ends of the underside seal 6, which will be described in detail later.

As illustrated in FIG. 2, fallout-inhibiting protrusions 9, which are formed of the elastic member 8, respectively protrude from the opposing ends of the underside seal 6 in the longitudinal direction. Also, receiving holes 10 are respectively drilled in the vicinity of the opposing ends of the underside seal 6. As illustrated in FIG. 3B, each of the receiving holes 10 extends through the flat portion 7*a* of the cored bar 7 and the elastic member 8 coated on the faces of the flat portion 7*a*. A guide portion 10*a* formed of the elastic member 8 is provided on the inner wall of a portion of the receiving hole 10 corresponding to the cored bar 7, and the thickness of the guide portion 10*a* is increased gradually in a downward direction in FIG. 3B such that the guide portion 10*a* is inclined.

The underside seal 6 structured as described above is secured to the slider S through the receiving holes 10, which will be described in detail below.

Figure 4:
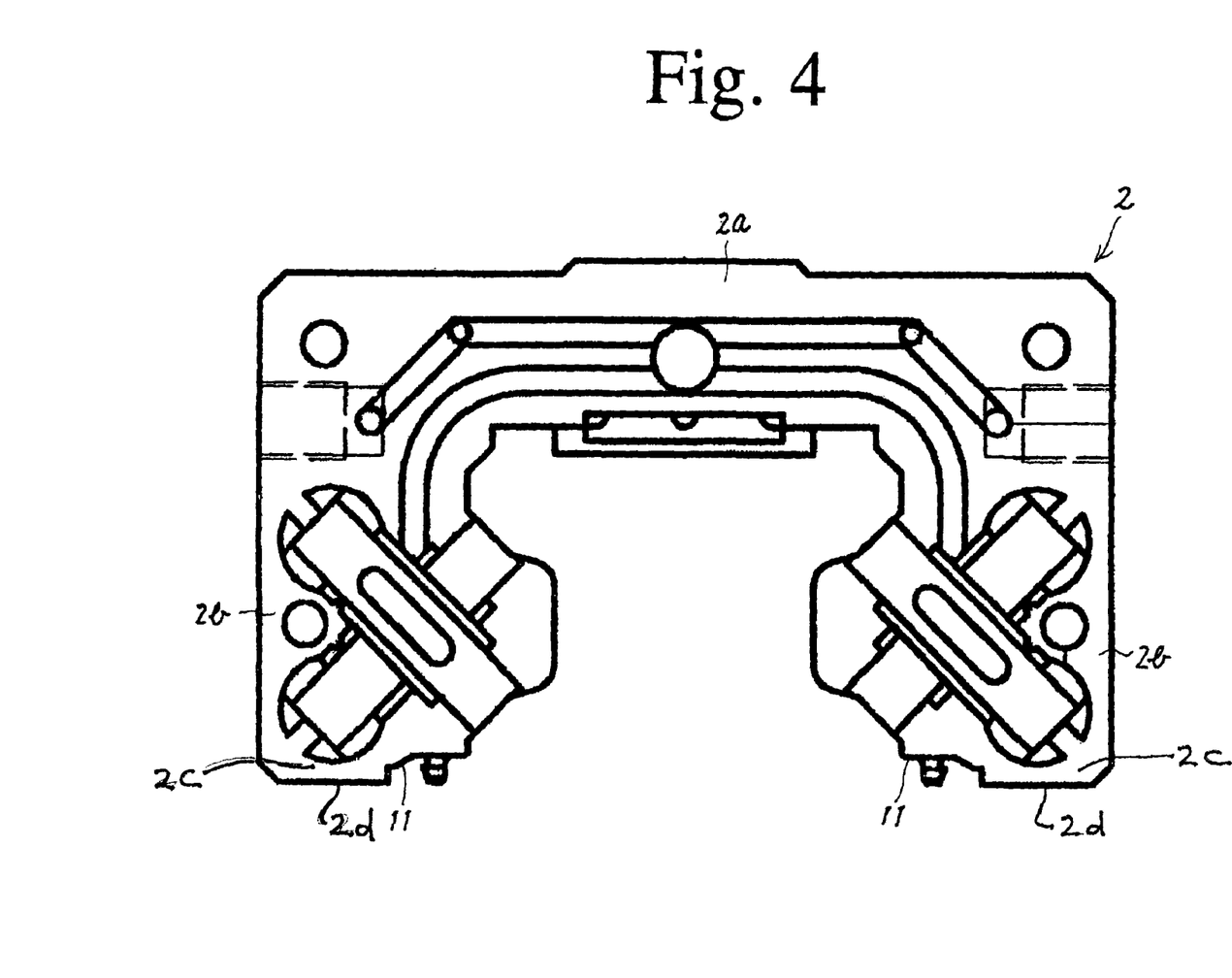
FIG. 4 is a plan view of an end cap.
Figure 5:
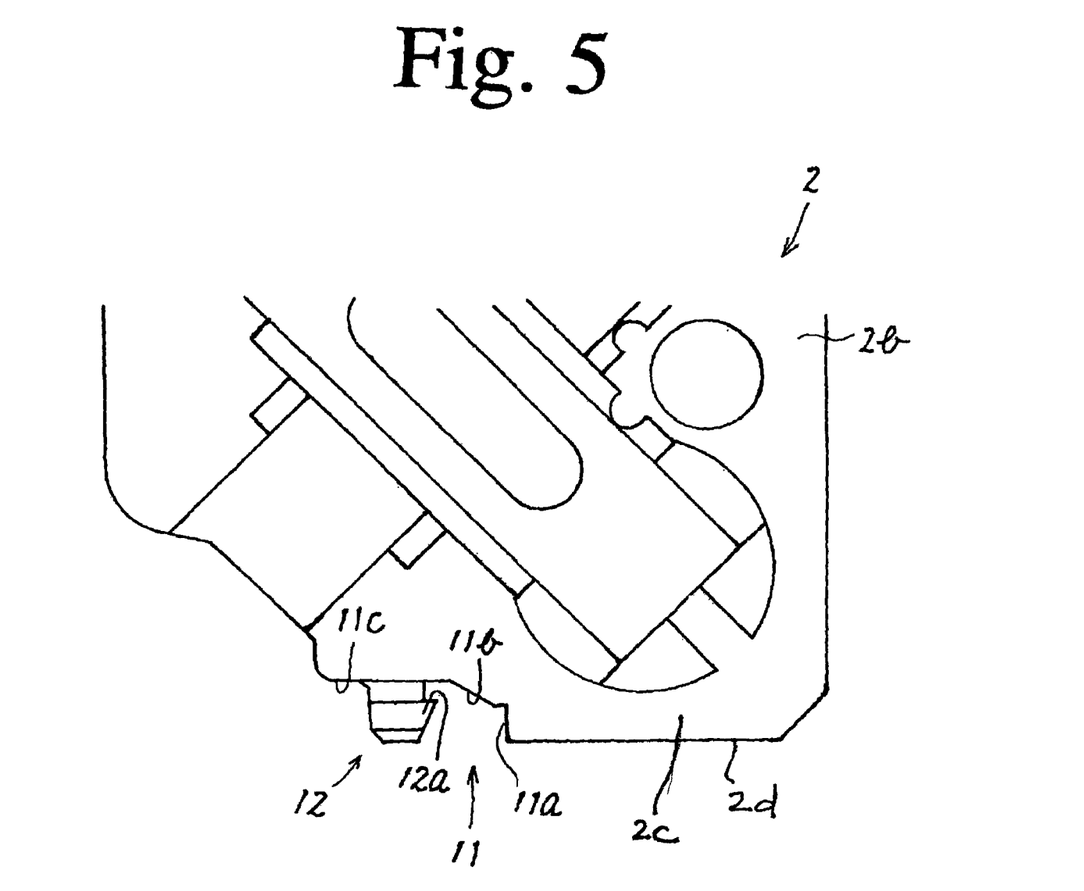
FIG. 5 is a partial enlarged view of FIG. 4.

As illustrated in FIG. 4 and FIG. 5, stepped portions 11 are respectively formed on the opposing faces of the respective side portions 2*b* of each end cap 2 at the leading ends of the side portions 2*b*. Each of the stepped portions 11 includes a pressure connecting face 11*a*, an inclined portion 11*b* and a flat portion 11*c*. The pressure connecting face 11*a* is recessed from the surface 2*d* of the leading end 2*c* of the side portion 2*b* by the thickness of the underside seal 6 at right angles to the leading end face 2*d* of the side portion 2*b*. The inclined portion 11*b* is inclined diagonally from the pressure connecting face 11*a*. The flat portion 11*c* adjoins and extends from the inclined portion 11*b* in parallel to the leading end face of 2*d* the side portion 2*b*. The depth from the leading end face 2*d* of the side portion 2*b* to the flat portion 11*c* of the stepped portion 11 is set approximately equal to the thickness of the underside seal 6.

Then, an engaging projection 12 extends out from the flat portion 11*c* toward the leading end face 2*d* of the side portion 2*b*. The engaging projection 12 is provided with a hook 12*a* increased in width gradually from the leading end toward the base. The hook 12*a* is inserted into each receiving hole 10 of the underside seal 6 to hold the underside seal 6.

The process of securing the underside seal 6 to the slider S will be described below in detail with reference to FIGS. 6 and 7.

Figure 6:
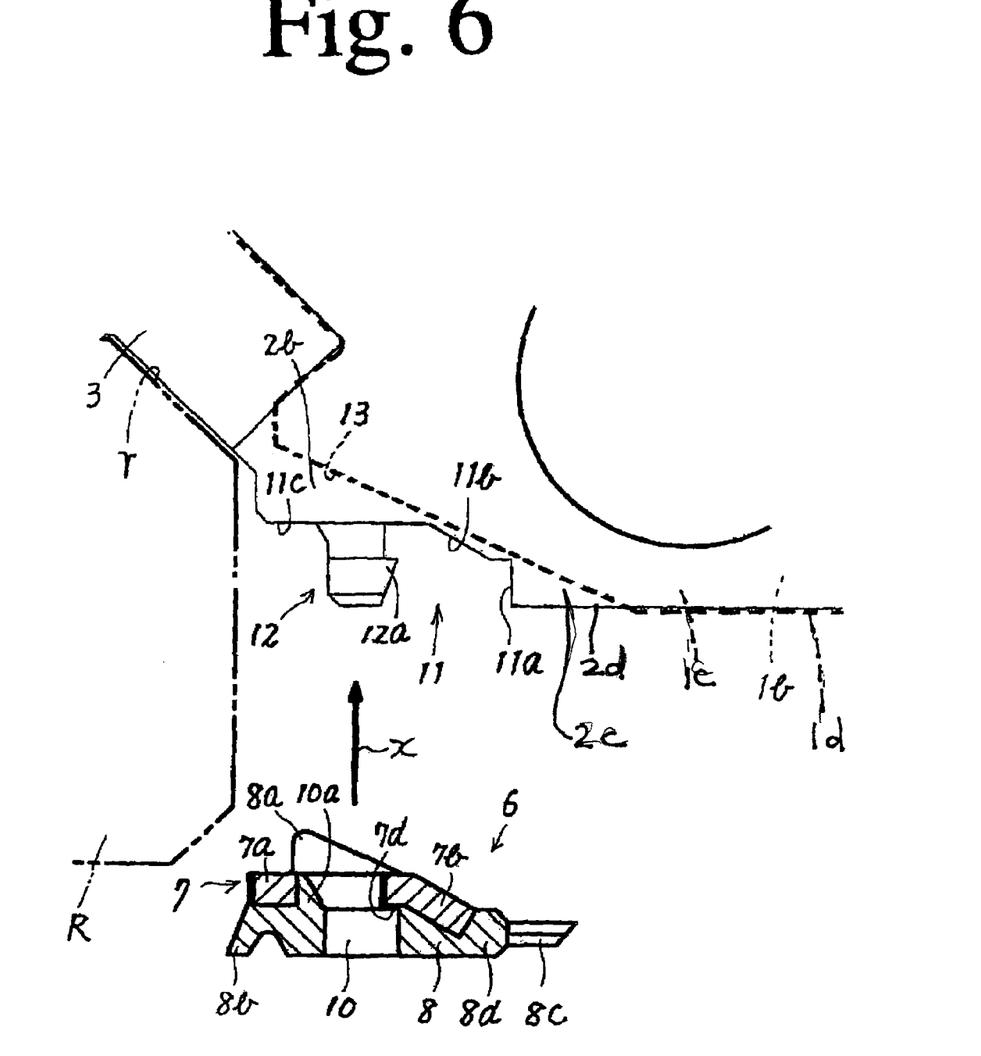
FIG. 6 is a view illustrating a step for securing an underside seal.

As illustrated in FIG. 6, the underside seal 6 is placed with the elastic protrusions 8*a* facing the slider S (i.e., the casing 1 and the end caps 2) and the receiving holes 10 of the underside seal 6 are aligned with the leading ends of the engaging projections 12 protruding from the side portions 2*b* of the end caps 2, In this state, the underside seal 6 is moved in the x direction in FIG. 6, so that the hooks 12*a* of the engaging projections 12 enter the receiving holes 10 while elastically deforming the guide portions 10*a*. At this stage, the underside seal 6 is pushed further and the ends of the underside seal 6 are pressed against the stepped portions 11 of the end caps 2. Thus, as illustrated in FIG. 7, the hooks 12*a* engage with an interlocking face 7*d* of the cored bar 7 to hold the underside seal 6.

When the hooks 12*a* engage with the interlocking face 7*d* as described above, the pressure connecting portions 8*d* maintains the dimensional relationship ensuring that it is pressed and fitted between the inclined portion 7*b* of the cored bar 7 and the pressure connecting face 11*a*.

As a result, the underside seal 6 is in close contact with the flat portions 11*c* of the stepped portion 11 so that the ends of the underside seal 6 are reliably secured to the end caps 2 by the engagement of the hooks 12*a* with the interlocking faces 7*d* and by the pressure-connecting force of the pressure connecting portion 8*b*-8*d* pressed against the pressure connecting face 11*a*.

Figure 7:
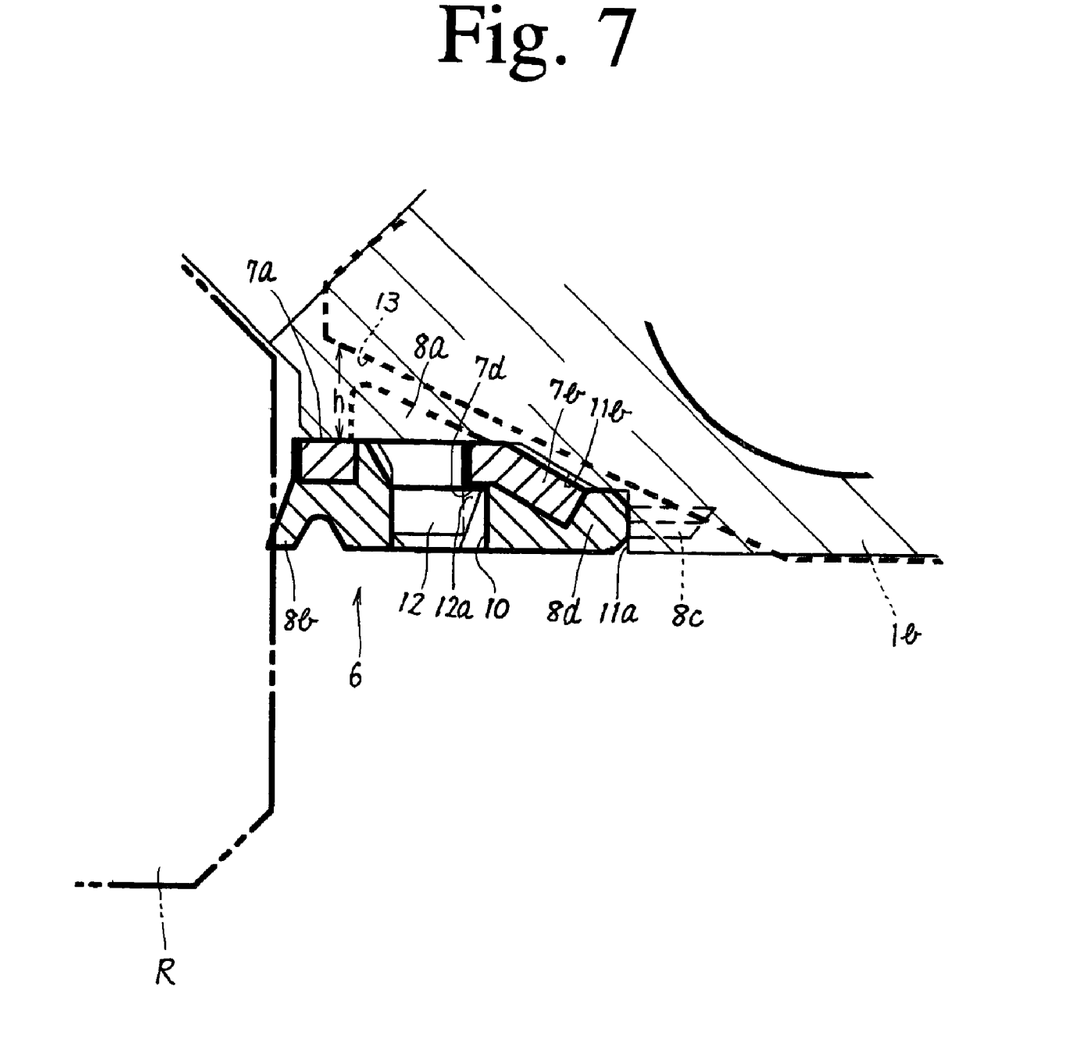
FIG. 7 is a view illustrating a secured underside seal.

The casing 1 is indicated with a dotted line in FIGS. 6 and 7. The casing 1 has inclined faces 13 respectively formed on the opposing faces 15 of the respective side portions 1*b* of the casing 1 at the leading ends 1*c* of the side portions 1*b*. In other words, the casing 1 has the inclined faces 13 formed in portions corresponding to the stepped portions 11 of the end caps 2. As is seen from FIGS. 6 and 7, when the casing 1 and the end caps 2 are fitted together, each of the stepped portions 11 is located between the leading end face 2*d* of the side portion 2*b* and the inclined face 13.

Hence, when each end of the underside seal 6 is pressed against the end cap 2 (the stepped portion 11), a gap h is maintained between the casing 1 (the inclined face 13) and a central portion of the underside seal 6.

The elastic protrusion 8*a* formed on the underside seal 6 protrudes toward the inclined face 13, whereby the gap h created between the inclined face 13 and the underside seal 6 is decreased.

The reason why part of the gap h is narrowed by use of the elastic protrusion 8*a* as described above is because the engaging projection 12 is prevented from being broken or cracked even when the underside seal 6 receives a force pushing it in the upward direction in FIGS. 6 and 7.

A possible example of pushing the underside seal 6 in the upward direction in FIGS. 6 and 7 occurs in the transportation of the slider S. When a worker picks the slider S up by hand, in order to pick the slider S up while his fingers are placed on the first lip portions 8*b* of the underside seals 6. As a result, the first lip portions 8*b* are pushed in the upward direction in FIGS. 6 and 7.

At this point, each underside seal 6 is held by being pressed against the slider S by the engaging projections 12 and the pressure connecting portions 8*d* in the vicinity of the ends of the underside seal, i.e., in the portions corresponding to the end caps 2. However, in the portion of the underside seal 6 corresponding to the casing 1, the second lip portion 8*c* alone is in contact with the casing 1. For this reason, if the elastic protrusion 8*a* is not provided, an increase of the facing distance between the casing 1 and the underside seal 6 results.

When the facing distance between the casing 1 and the underside seal 6 is large, if a force pushing in the upward direction in FIGS. 6 and 7 is applied to the underside seal 6 as described above, the portion of the underside seal 6 corresponding to the casing 1 is deformed. Then, the deformation causes a crack to occur in the engaging protrusion 12 of the end cap 2 or causes the hook 12*a* to be broken.

To avoid this, in the embodiment, the elastic protrusion 8*a* is provided for reducing the gap between the underside seal 6 and the inclined face 13 in order to prevent deformation of the portion of the underside seal 6 corresponding to the casing 1. Accordingly, even if the first lip portion 8*b* receives a force pushing it in the upward direction in FIG. 6 or 7, the elastic protrusion 8*a* comes into contact with the inclined face 13, so that the underside seal 6 is not deformed. In this manner, since the underside seal 6 is prevented from being deformed, the stress acting on the underside seal 6 does not affect the engaging projection 12.

When the underside seal 6 is secured to the slider S as described above, the leading edge of the first lip portion 8b is in slight contact with the side face of the rail R, and the leading edge of the second lip portion 8c is in contact with the inclined face 13 of the casing 1. As a result, it is possible to seal the gap created between the side face of the rail R and the side portion of the slider S over the full range of the slider S in the sliding direction.

Figure 8:
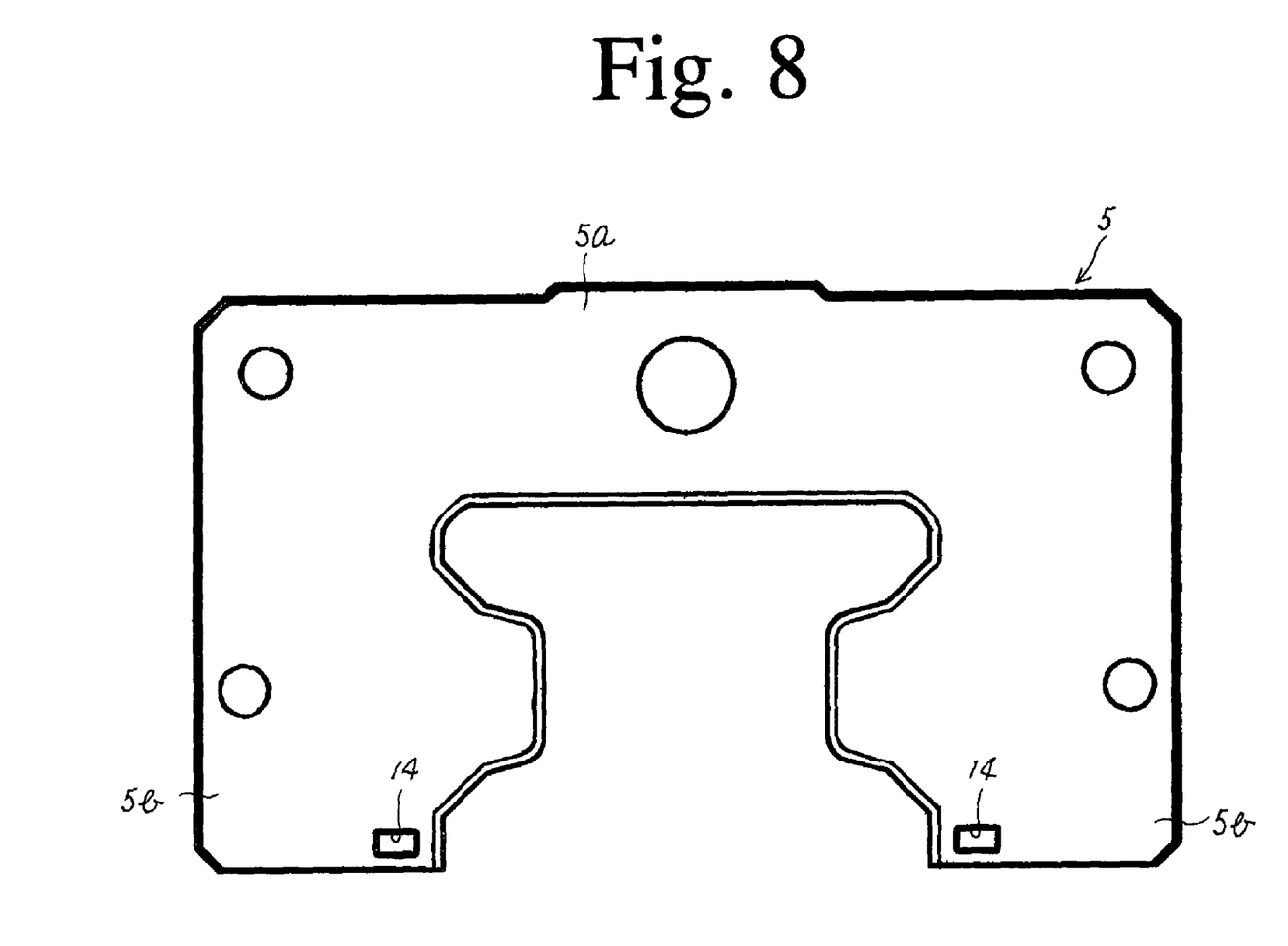
FIG. 8 is a plan view of an end-face seal.

As described earlier, the end-face seals 5 which are components independent of the end caps 2 are secured on the ends of the slider S in the sliding direction. As illustrated in FIG. 8, each of the end-face seals 5 has recessed holding portions 14 formed therein.

As in the case of the casing 1 and the end cap 2, each of the end-face seals 5 has a body 5a and a pair of side portions 5b extending out from the ends of the body at right angles. The holding portions 14 are formed in the opposing faces and at the leading ends of the respective side portions 5b.

Figure 9:
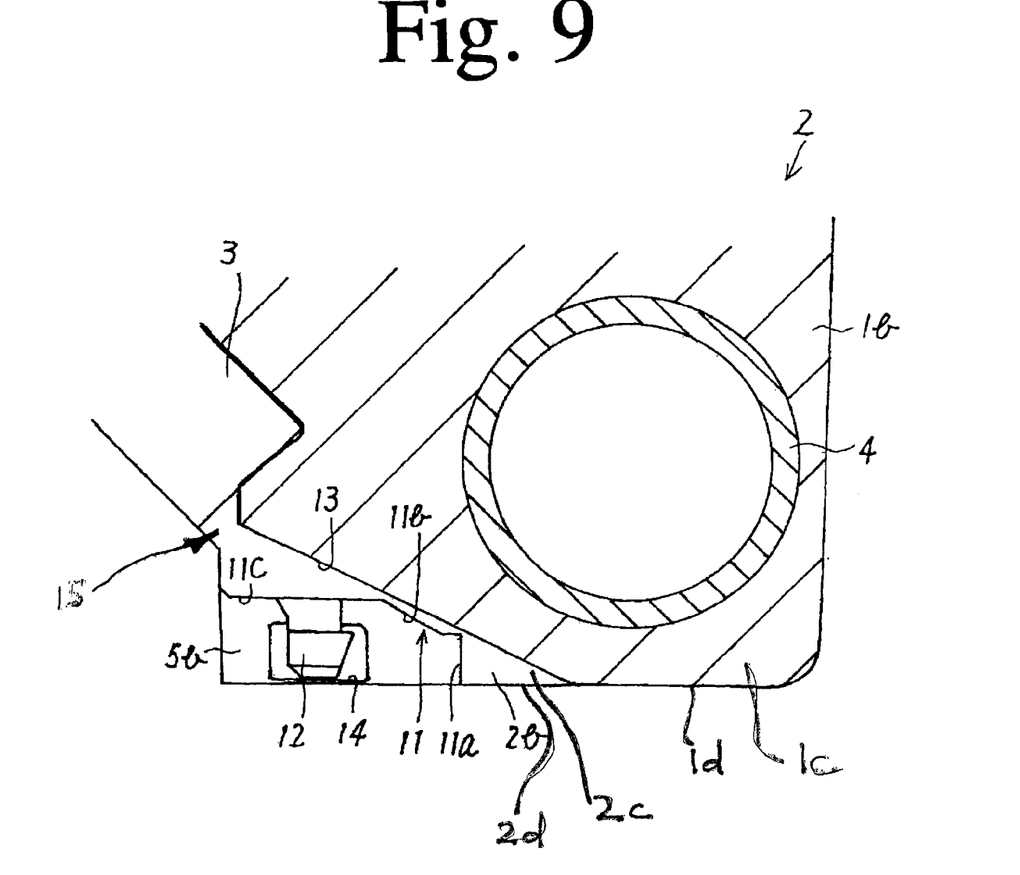
FIG. 9 is a partial enlarged view showing a casing, an end cap and a side portion of an end-face seal.

FIG. 9 illustrates the relative relationship between the casing 1, the end cap 2 and the end-face seal 5. The inclined face 13 is formed at the leading end of the side portion 1b of the casing 1. The stepped portion 11 is formed in the leading end of the side portion 2b of the end cap 2 beyond the inclined face 13. In other words, there are notched portions of the leading end of the side portion 1b of the casing 1 and the leading end of the side portion 2b of the end cap 2 which are located close to the rail R. On the other hand, a notched portion is not formed in the leading end of the side portion 5b of the end-face seal 5. Accordingly, as shown in FIG. 9, when the slider S is viewed from the casing 1 toward the end-face seal 5, the side portion 2b of the end cap 2 can be slightly seen from the leading end of the side portion 1b of the casing 1, and also the holding portion 14 of the end-face seal 5 can seen from the stepped portion 11 formed in the end cap 2.

Then, when the underside seal 6 is secured to the slider S, the holding portion 14 is located on the axis of the underside seal 6 secured to the slider S and the fallout-inhibiting protrusion 9 projecting from each of the ends of the underside seal 6 (see FIG. 2) is inserted into the holding portion 14.

Figure 10:
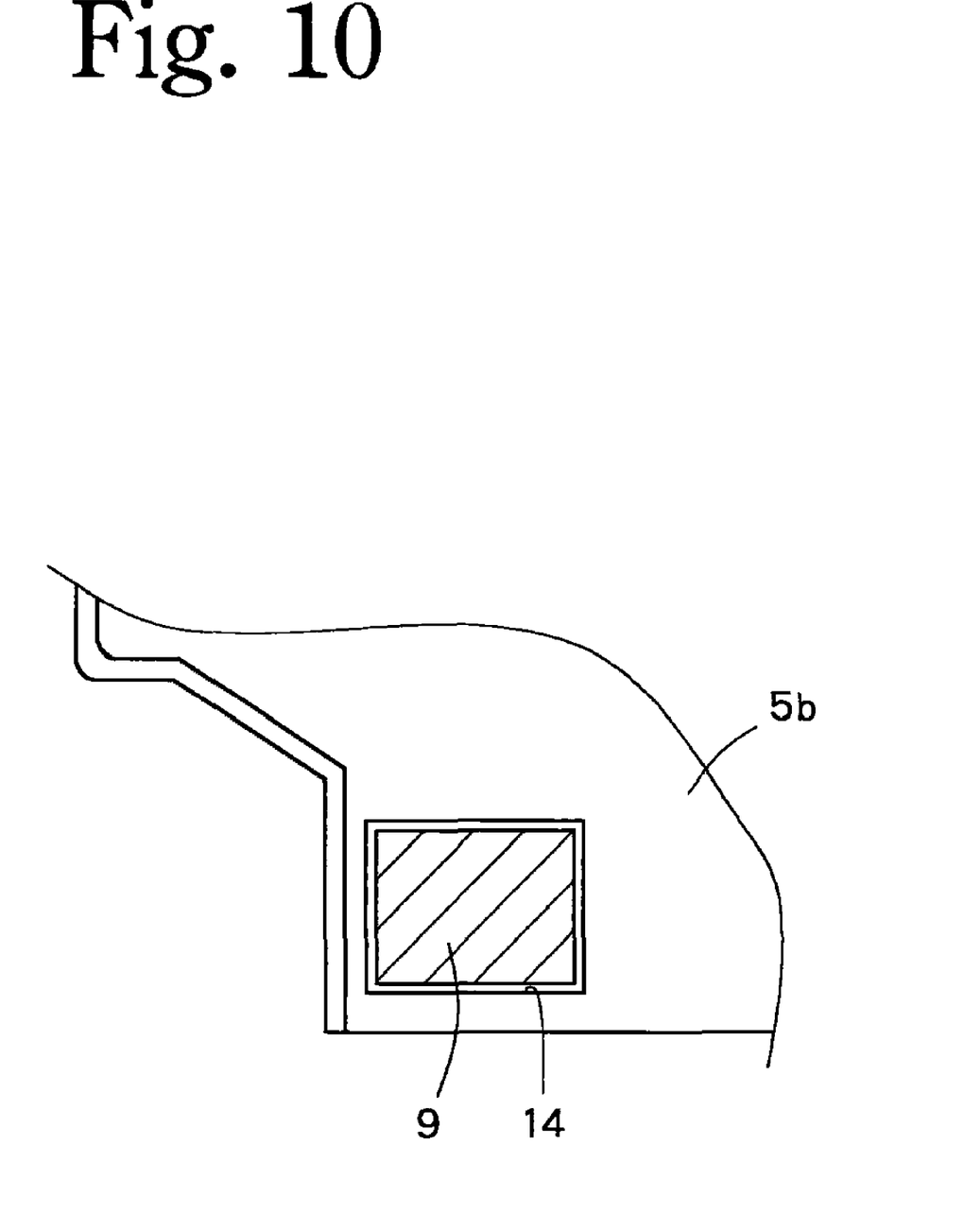
FIG. 10 is a partial enlarged view illustrating an end-side seal.

As illustrated in FIG. 10, when the fallout-inhibiting protrusion 9 is inserted into the recess forming the holding portion 14, the recess and the fallout-inhibiting protrusion 9 have a dimensional relationship that maintains a gap between the recess and the outer peripheral face of the fallout-inhibiting protrusion 9.

In this manner, a gap is maintained between the outer peripheral face of each fallout-inhibiting protrusion 9 and each holding portion 14, with the result that the engaging projections 12 alone hold the underside seal 6. That is, when the underside seal 6 is secured to the slider S, a gap is created between the outer peripheral face of the fallout-inhibiting protrusion 9 and the holding portion 14. This means that the fallout-inhibiting protrusion 9 does not contribute to the holding of the underside seal 6. The reason why the role in securing the underside seal 6 to the slider S is given not to the fallout-inhibiting protrusion 9, but to the engaging projection 12 alone is as follows.

If the fallout-inhibiting protrusion 9 is pressed into the holding portion 14 and the same role as that of the engaging projection 12 is given to the fallout-inhibiting protrusion 9, the underside seal 6 will be secured by both the engaging projection 12 and the fallout-inhibiting protrusion 9. If the underside seal 6 is held at two points at each end in this manner, when an external force is applied to the underside seal 6, it is difficult to relieve the external force. As a result, the engaging projection 12 and/or the fallout-inhibiting protrusion 9 will be easily broken. To avoid this, the gap is maintained between the outer periphery of the fallout-inhibiting protrusion 9 and the holding portion 14 in order to relieve the external force applied to the underside seal 6

The fallout-inhibiting protrusion 9 functions only when the engaging projection 12 is damaged and cannot hold the underside seal 6. That is, if the engaging projection 12 is damaged, it goes without saying that the engaging projection is incapable of holding the underside seal 6, resulting in the falling away of the underside seal 6 from the slider S. However, in the linear motion rolling guide unit according to the embodiment, even when the engaging projection 12 is damaged and cannot hold the underside seal 6, the fallout-inhibiting protrusion 9 engages with the holding portion 14. Thus, since the underside seal 6 does not fall away from the slider S, it is possible to prevent the falling of the underside seal 6 from having various adverse effects on the apparatus.

Since the size of the gap between the outer periphery of the fallout-inhibiting protrusion 9 and the holding portion 14 is not particularly limited, the dimensional relationship between the fallout-inhibiting protrusion 9 and the holding portion 14 can be determined somewhat roughly.

The greatest feature of the present invention is that the underside seal is prevented from falling away from the slider by the fallout-inhibiting protrusions formed at the opposing ends of the underside seal.

Therefore, the underside seal is not necessarily shaped in a flat plate form, so that the cross-sectional shape of the underside seal is not particularly limited.

The shapes of the end cap, the engaging projection for holding the underside seal, and the receiving hole formed in the underside seal are not limited to those described in the embodiments. Whatever the case, what is required is that the underside seal is reliably secured to the slider through the engaging projections formed on the end caps and the receiving holes formed in the underside seal.

The foregoing embodiment has described the case of using rollers as the rolling elements, but it is needless to say that balls can be used as the rolling elements.

The foregoing embodiment has described the elastic protrusions arranged at intervals along the longitudinal direction of the underside seal. However, a single elastic protrusion may extend without interval in the range of the underside seal facing the casing in the longitudinal direction of the underside seal.

In the forgoing embodiment, the holding portion is formed in the end-face seal for preventing the underside seal from falling off. However, the holding portion may be formed integrally with the end cap and may be a hole rather than a recess. Whatever the case, what is required is to establish a dimensional relationship to allow for the insertion of the fallout-inhibiting protrusions formed on the ends of the underside seal into the holding portions and for the gap created between the outer periphery of each fallout-inhibiting protrusions and each of the holding portions.

What is claimed is:

1. A linear motion rolling guide unit, comprising
   a slider comprising a casing including an elongate casing body having a pair of casing sides at respective longitudinal side regions of the casing body and a pair of casing ends at respective transverse ends of the casing, and a pair of casing side portions extending out respectively from both sides of the casing body at right angles to the length of the casing body, and a pair of end caps each including an elongate end cap body having a pair of end cap body sides at respective longitudinal end regions of the end cap body and a pair of end cap side portions extending out respectively from both sides of the end cap body at right angles to the length of the end cap body, the pair of end caps respectively secured to both ends of the casing, each of said end cap side portions having a leading end face distal from said end cap body, an underside seal provided between the leading ends of the respective end cap side portions of the pair of respective end caps and having a function of preventing entry of dust, the end cap having engaging projections formed thereon, the underside seal having receiving holes formed therein, the engaging projections being fitted into the receiving holes in order to secure the underside seal to the slider, wherein the slider comprises end-face seals provided independently of the end caps and respectively secured to the ends of the slider in a sliding direction of the slider, the underside seal comprises fallout-inhibiting protrusions provided at both ends of the underside seal in a longitudinal direction thereof, the end-face seals including holding portions in the form of either a hole or a recess into which the fallout-inhibiting protrusion is inserted, the holding portion maintains a gap from the outer periphery of the fallout-inhibiting protrusion of the underside seal, said pair of casing side portions have respective faces which are in opposed relationship to each other and respective leading end faces distal from said casing body, inclined faces are formed on portions of the opposed faces of the pair of side portions of the casing in the region of the leading end faces of the side portions of the casing, said pair of end cap side portions have respective faces which are in opposed relationship to each other, stepped portions are formed on the opposed faces of the side portions of the end cap in the region of the leading end faces of the side portions of the end cap, wherein the stepped portion of each end cap is located between the leading end face of the end cap side portion and the inclined face of the casing side portion, and, wherein the underside seal is pressed against the stepped portion by the engaging projections being fitted into the receiving holes, and a gap is maintained between the inclined face of the casing and the underside seal.

2. A linear motion rolling guide unit according to claim 1, wherein the underside seal has an elastic protrusion formed in a portion facing the inclined face of the casing and the elastic protrusion reduces the gap between the inclined face and the underside seal.

* * * * *